United States Patent [19]

Hooper et al.

[11] Patent Number: 4,635,993
[45] Date of Patent: Jan. 13, 1987

[54] AUTOMOBILE WINDSHIELD COVER

[76] Inventors: Stanley W. Hooper, 3430 Mauricia Ave.; Charles L. Hooper, 3776 Flora Vista Ave., both of Santa Clara, Calif. 95051

[21] Appl. No.: 697,177

[22] Filed: Feb. 1, 1985

[51] Int. Cl.$^4$ .............................................. B60J 1/20
[52] U.S. Cl. ............................... 296/95 C; 296/95 Q
[58] Field of Search ................ 296/95 R, 95 C, 95 Q, 296/97 A, 136; 160/368 S

[56] References Cited

U.S. PATENT DOCUMENTS

| | | | |
|---|---|---|---|
| 2,437,845 | 3/1948 | Wyeth | 296/95 C |
| 2,599,066 | 6/1952 | Osborn | 296/95 C |
| 2,624,406 | 1/1953 | Szychomski | 296/95 C |
| 2,646,118 | 7/1953 | Berty | 160/368 S |
| 4,355,839 | 10/1982 | Rosen | 296/136 |

Primary Examiner—Robert R. Song
Attorney, Agent, or Firm—Allston L. Jones

[57] ABSTRACT

A method of attachment of an external vehicle cover which includes means for discouraging theft of the cover is disclosed. The cover is made from a flexible material tailored to the section of the vehicle to be protected. It includes regions that can be clamped between articulating parts of the vehicle, such as a door and its frame. The end of the clamped region of the cover which is interior to the vehicle terminates in a thickened bead which prevents it from being pulled from the interior of the vehicle between the clamping surfaces of the vehicle. Thus the cover can only be removed from the vehicle by opening the door or cutting the ends therefrom. Removal by cutting renders the cover unusable and thus useless to a thief.

11 Claims, 6 Drawing Figures

AUTOMOBILE WINDSHIELD COVER

BACKGROUND & SUMMARY OF THE INVENTION

This invention relates to flexible covers which protect various portions of vehicles from environmental factors such as sun, snow, frost, and dirt, and more particularly to a design to prevent theft of such covers.

A protective cover for a vehicle should afford optimum protection while at the same time being durable, convenient and secure from theft. It should not in itself have the potential to cause damage to the vehicle.

Exposure to sunlight is a major cause of deterioration of the plastic and rubber parts of vehicles. Portions of the vehicle interior, such as the dashboard are particularly susceptible to discoloration and cracking because they are directly exposed to sunlight through the windshield and side windows. The prior art includes several types of window covers designed for such protection that are placed either inside or outside the vehicle.

Among the protective covers for use inside are Venetian blinds, unfoldable fans, and flexible fabric covers laid directly over the dashboard. Venetian blinds are most suitable for the side and rear windows because they are generally semi-permanently installed and they would partially obstruct the driver's view if placed inside the windshield. However, covering large expanses of curved glass, such as the rear windows of many cars, is cumbersome. Further, Venetian blinds require modifications to the vehicle for their attachment, which mar the appearance even when they are not in place.

Unfoldable fans, made from individual petals fastened together at a common pivot point, give some solar protection when placed in windows. However, they require some modification of the vehicle for their attachment. They also cannot completely cover a window because the protection area is limited to a portion of a circle which is determined by the length of the petals and placement of the pivot.

Specific covers for parts of the interior, such as the dashboard have been used to give protection to individual items. These covers may need Velcro or other fasteners permanently attached to the vehicle to hold them in place.

All inside covers allow sunlight to enter the vehicle and thus do not prevent the interior from being heated. They protect only what is in their shadow from direct exposure to the sun.

External covers have the advantage of more fully protecting against the sun because the light never enters the vehicle. In addition, they can also protect against other environmental factors such as snow, frost and dirt. However, prior designs have a number of shortcomings. Those that rely on clips to hold them in place, such as the design of U.S. Pat. No. 4,049,036 are tedious to install and adjust. The clips also have the potential for scratching the vehicle at the attachment points. Covers held on by weights, such as sandbags, necessitate moving the weights during installation and removal. Yet other covers require the installation of snaps, or other fasteners, to the vehicle to mate with a similar fastener on the edges of the cover. Such an installation alters the appearance, and perhaps the performance, of the vehicle.

Covers that make use of the existing attachment opportunities on a vehicle are thus to be preferred. One such design is disclosed in U.S. Pat. No. 2,599,066. The ends of the windshield cover disclosed therein includes an extension at either end which is just long enough to be captured between each side door and its frame. In addition, an upper and lower elastic strap is attached to each end for extension into the vehicle to hold the cover in place. Further, each of the upper straps includes a suction cup to attach the strap to the interior surface of the windshield. This makes for a complicated and time consuming attachment procedure. This cover, like all other prior art external covers, is vulnerable to theft by simply unfastening them or pulling them free of the doors.

The cover of the present invention gives optimum environmental protection by being placed externally, uses existing attachment sites on the vehicle, can be applied quickly, and cannot be stolen without destroying its utility. The cover is made from flexible material, and its shape is tailored to the portion of the vehicle to be covered, such as the windshield. It clamps in place between articulating parts of the vehicle, such as between the door and door frame. The portions of the cover to be clamped extend into the interior of the vehicle and terminate in thickened beads which are filled with a solid shaft or resilient material. The bead is sized so that it cannot be withdrawn from the interior of the vehicle without opening the door. If the door is locked, the cover can only be removed by cutting it, which renders it useless since it is now too short to be captured by the doors or other moveable exterior surfaces of the vehicle.

DESCRIPTIONS OF THE DRAWINGS

DESCRIPTION OF THE PREFERRED EMBODIMENT

Figure 1A:
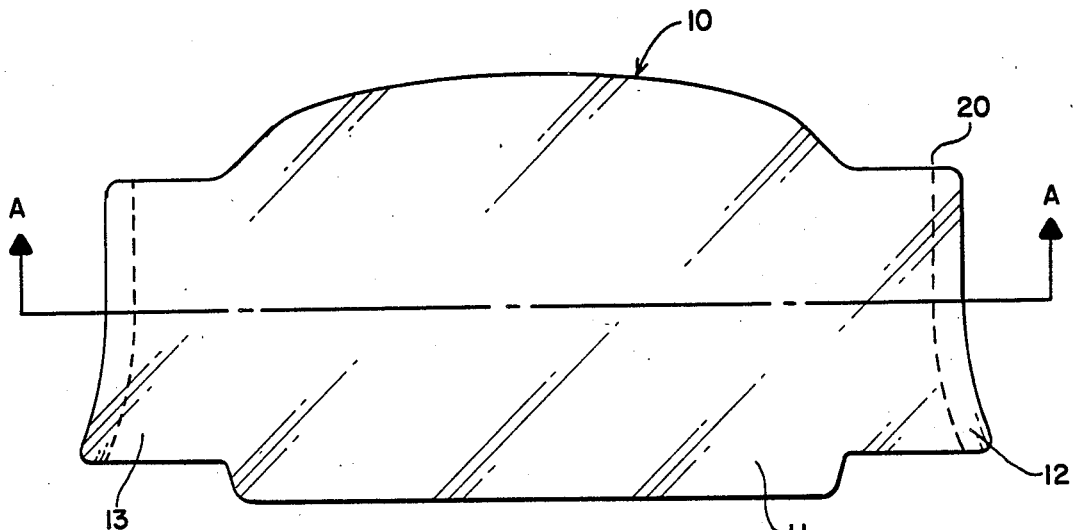
FIG. 1a shows a plan view of a first embodiment of the present invention for covering the windshield of a vehicle.
Figure 1B:
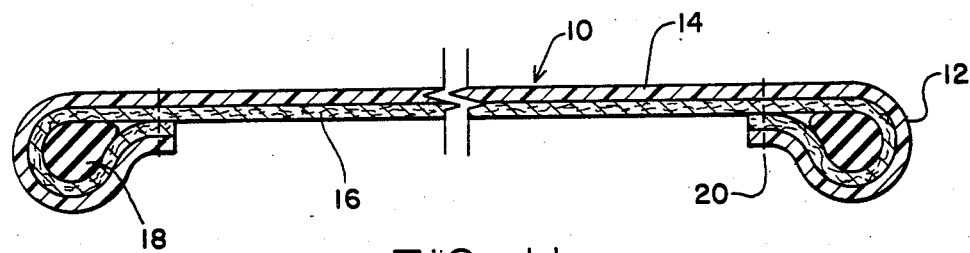
FIG. 1b is a cross-sectional view of the invention of FIG. 1a taken along line A—A.

FIG. 1a shows an external cover 10 for a vehicle windshield incorporating the first embodiment of the present invention. It includes a sheet of a flexible material 11 tailored to the shape of the windshield, and thickened beads 12 (FIG. 1b) at either end. The cover is most useful when the material of which is it made is chosen based on its intended function. A cross-section of a two-layer cover is shown in FIG. 1b. The outer layer 14 is made from a material such as vinyl, which is resistant to sunlight, while the inner layer 16 is a soft fabric to prevent scratching or sticking to the vehicle or the window. Each bead 12 is formed by enclosing a core 18 in the cover material and fastening it with a seam 20.

Figure 2:
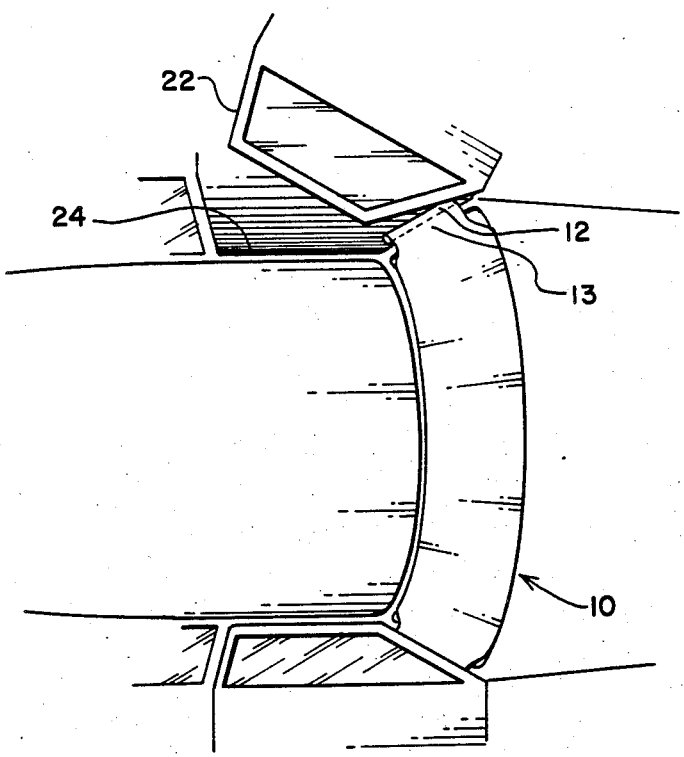
FIG. 2 is a view of a windshield cover of FIG. 1a being secured to a vehicle.

FIG. 2 illustrates the ease of attachment of such a cover to the windshield of a vehicle. First the windshield wipers are lifted away from the windshield and the cover is layed in place. One door 22 is opened and the adjacent bead 12 is placed so that when the door is closed it will be inside the vehicle. The clamping region 13 of the cover is captured between the door 22 and the door frame 24 when the door is closed. This process is then repeated with the other door. The core 18 of bead 12 can be any material which is rigid enough or thick enough when compressed to keep the bead from collapsing and being pulled from the vehicle between the door and frame if an attempt is made to remove the cover without opening the doors. The use of a resilient material such as foam rubber or plastic has the added advantage of preventing damage to the bead 12 or the door and door frame of the vehicle if an attempt is made to inadvertently clamped bead 12 between the door and frame. Through experimentation, it has been determined that a foam bead should be at least one inch in diameter.

Designed in this way, the cover cannot be removed without cutting off the beads or opening the doors of the vehicle. If the doors are locked, the cover is secure. A cover which is cut off will not be functional unless there is sufficient material remaining at its ends to still allow clamping between the door and frame. To assure that a cover 10 will not be reusable when the bead end is cut off cover 10 should be tailored so that clamping regions 13 are only long enough for the beads to extend just inside the vehicle when the doors are closed.

Figure 3A:
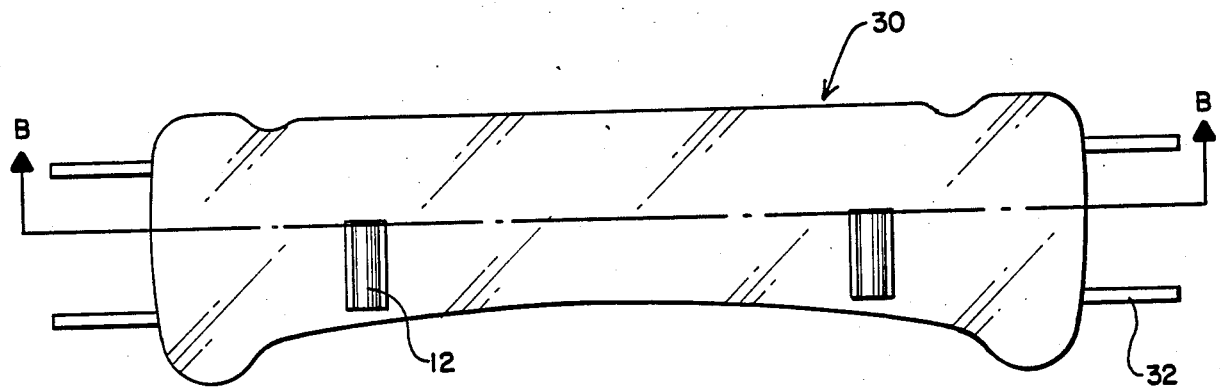
FIG. 3a is a plan view of a second embodiment cover for a portion of a vehicle which requires that the cover be secured at points other than along the periphery of the cover.
Figure 3B:
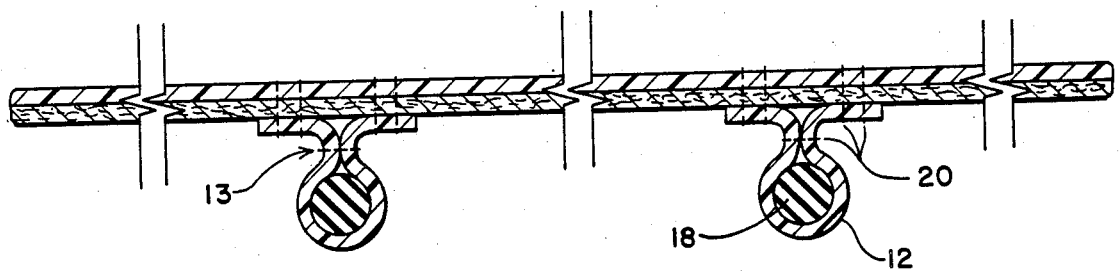
FIG. 3b is a cross-sectional view of the cover of FIG. 3a taken along the line B—B.

FIG. 3a shows a cover 30 for another area of a vehicle, such as the hood and grille. The number and configuration of the bead(s) 12 on the cover is dictated by the clamping sites presented on the vehicle; in this case the opening between the hood and fenders of a car. Additional straps 32 may be required to hold the periphery of the cover in place on the vehicle. The antitheft function of the bead(s) 12 does not require their placement at the periphery of the cover. FIG. 3b illustrates a method of attaching such beads to the cover with seams 20. The length of the clamping region 13 is again minimized to enhance security.

Figure 4:
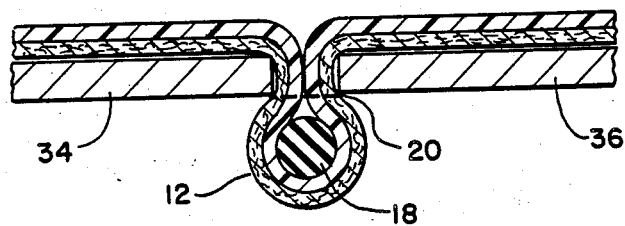
FIG. 4 shows a portion of the cross-sectional view shown in FIG. 3b wherein one of the beads is shown captured between two adjacent surfaces of a vehicle.

The shape, number and placement of the antitheft beads 12 is dictated by the clamping opportunities presented in the vicinity of the area to be covered. As illustrated in FIG. 1a they may be curved to better conform to the shape of the vehicle. They may also be made as a series of adjacent segments. The greater the damage a thief must do to the cover to remove it, the more he will be discouraged. Thus, the design of a bead and its attachment to the cover is important. An alternative design to that of FIG. 3b is shown in FIG. 4. Here, the only seam 20 forming bead 18 is hidden between the clamping surfaces 34 and 36 of the vehicle. If this bead is cut from the cover by a thief, the cover itself will be slit and therefore unusable.

Covers constructed according to the principles of this invention have a wide spectrum of applications. They can be attached anywhere that appropriate clamping sites are present in the vicinity of the area to be covered. They can be used on vehicles such as cars, trucks, airplanes, boats and motor homes. Clamping sites may be found at the edges of hoods, doors, trunks, hatches, hatchbacks and sunroofs. For example, the side and rear windows of an automobile can be covered by a continuous piece of material that is clamped in the rear edge of the front doors and at the upper edge of the trunk lid. A cover for the long sloping rear window on a hatchback automobile can be clamped by the hatch itself. An airplane windshield can be covered like that of an automobile.

The utility of a cover is increased if the choice of its material is based on the intended function. If it is to be exposed to sunlight, then the exposed surface is best made from sun-resistant material. Covers for boats docked in salt water should also be resistant to salt spray. Further, covers should be made of a material that maintains its flexibility over the temperature range expected to be encountered. Achieving all of the desired properties with a single cover may be achieved through the use of a multi-layer cover. For example, FIG. 1b illustrates a two layer cover. The outer layer 14, is resistant to sunlight and the soft inner layer 16 keeps the cover from sticking to or scratching the protected windshield. To improve the insulating properties of this cover, an additional layer of insulating material could be inserted between the two that are shown. A dust cover for a vehicle parked inside might require only one layer.

From the foregoing description, it will be apparent that the invention disclosed herein provides a novel and advantageous protective vehicle cover. As will be understood by those familiar with the art, the invention may be embodied in other specific forms without departing from the spirit or essential characteristics thereof.

What is claimed is:

1. A cover for a selected exterior portion of a vehicle, said cover comprising:
    a continuous piece of a selected flexible material having:
        a central body portion sized and shaped to cover the selected portion of the vehicle to be covered; and
        at least two clamping portions disposed to be captured at at least two different sites on the vehicle between two adjacent vehicle portions where at least one of each of the two adjacent vehicle portions is movable for holding the body portion in place on the vehicle, and sized and shaped to be as wide as possible without limiting the size and shape of the central body portion and to fit between said vehicle portions; and
    bead means affixed to each clamping portion along its entire width for holding the central body of the cover taut on the vehicle by placement of each bead means in juxtaposed position to the inner surface of the corresponding two adjacent vehicle portions with said bead portions being placed so that the movable vehicle portion comes into contact with the bead means upon closure to stretch the central body portion across the selected portion of the vehicle to be covered, and for preventing the theft of the cover from the vehicle with the bead means being of sufficient size to prevent its being withdrawn from between said two adjacent vehicle portions when said movable vehicle portion is closed with its adjacent vehicle portion.

2. A cover for a selected portion of a vehicle as in claim 1 wherein:
    said body portion is sized and shaped to cover a windshield of a vehicle; and
    said at least two clamping portions are at each end of the body portion for extending around the ends of the windshield and between the front door and its frame on each side of the vehicle.

3. A cover for a selected portion of a vehicle as in claim 1 wherein:
said body portion is sized and shaped to cover the front portion of the hood of a vehicle;
said at least two clamping portions are positioned to communicate with the cracks between the hood and each of the fenders of the vehicle; and
said cover further including attachment means on the ends of the body means which extend beyond the clamping portions for attaching the free ends of the body portion to the lower edge of each fender.

4. A cover for a selected portion of a vehicle as in claim 1 wherein:
said body portion is sized and shaped to cover the rear window of a vehicle having an openable compartment below and behind said window; and
said at least two clamping portions includes three clamping portions, a first and a second one at each end of the body portion for extending around the ends of the rear window and between a door and its frame on each side of the vehicle, and a third one on the lower edge of the body portion for extending into the top portion of the openable compartment of the vehicle.

5. A cover for a selected portion of a vehicle as in claim 1 wherein said body and clamping portions include at least one layer of a selected material to protect the covered portion of the vehicle from exposure to at least one environmental property.

6. A cover for a selected portion of a vehicle as in claim 5 wherein two layers of material are utilized, a first outer layer of a first selected material to protect the covered portion of the vehicle from the environmental property and a second bottom layer of a second selected material to minimize scratches from, and sticking of, the cover to the covered portion of the vehicle.

7. A cover for a selected portion of a vehicle as in claim 6 wherein:
said first selected material is vinyl having a coating for reflecting ultraviolet light; and
said second selected material is a soft, absorbent material.

8. A cover for a selected portion of a vehicle as in claim 1 wherein said bead portion includes:
a cylindrical means of a selected cross-section dimension; and
an extension of the flexible material of the clamping portion secured around the cylindrical means.

9. A cover for a selected portion of a vehicle as in claim 8 wherein said cylindrical means includes at least one wooden dowel.

10. A cover for a selected portion of a vehicle as in claim 8 wherein said cylindrical means includes a foam dowel sized so that when compressed the bead will be prevented from being drawn through the space between said two adjacent vehicle portions.

11. A cover for a selected portion of a vehicle as in claim 1 wherein at least one of said clamping portions is formed by taking a large tuck in the body portion with said bead means being captured within said tuck.

* * * * *